United States Patent Office 3,702,773
Patented Nov. 14, 1972

3,702,773
ALKANOLAMINE STABILIZED HIGH SOLIDS TITANIUM DIOXIDE SLURRY
Elmer Linwood Hall and John Thomas Looby, Wilmington, Del., assignors to E. I. du Pont de Nemours and Company, Wilmington, Del.
No Drawing. Continuation-in-part of application Ser. No. 118,566, Feb. 24, 1971, which is a continuation-in-part of abandoned application Ser. No. 856,162, Sept. 8, 1969. This application July 21, 1971, Ser. No. 164,898
Int. Cl. C09c 1/36, 3/02
U.S. Cl. 106—300
10 Claims

ABSTRACT OF THE DISCLOSURE

A stabilized aqueous titanium dioxide pigment slurry of from about 60 to 82 percent by weight titanium dioxide is useful in the manufacture of paper. About from 10 to 45 percent of the total titanium dioxide in the slurry is a first portion titanium dioxide which is alumina treated polyphosphate dispersed titanium dioxide; a second portion titanium dioxide comprising the remainder of the total titanium dioxide is dry finished titanium dioxide which has been ground in the presence of an alkanolamine. The slurry is then treated with a second alkanolamine. Preferably, the slurry is subjected to high shear milling.

CROSS-REFERENCE TO RELATED APPLICATIONS

This application is a continuation-in-part of application Ser. No. 118,566 filed Feb. 24, 1971 now abandoned, which in turn is a continuation-in-art of application Ser. No. 856,162 filed Sept. 8, 1969, and now abandoned.

BACKGROUND OF THE INVENTION

The present invention relates to the composition and preparation of a stabilized titanium dioxide slurry. More particularly, this invention pertains to a titanium dioxode slurry having a high concentration of solids, hereinafter referred to as a high solids slurry. The term "high solids slurry" denotes a slurry having a solids content greater than 30 percent solids by weight in suspension. Of particular interest in this invention are high solids slurries having a solids content in the range of from about 60 to 82 percent by weight.

Titanium dioxide pigments are used in the paper industry, both in paper coatings and by incorporation into the paper itself, to impart brightness and opacity to the paper products. Preferably, high solids slurries of titanium dioxide are prepared prior to their use in either wet-end addition or paper coating preparation and may subsequently be blended with other ingredients in coating preparation or may be diluted with water before being mixed with the paper pulp. It is desirable to have high solids slurries that could be shipped to and stored by the paper manufacture. However, in high solids slurries of titanium dioxide, the solids tend to settle out and cake during storage and transportation. In addition high solids slurries are difficult to pump due to inherent flow characteristics.

High solids slurries of titanium dioxide may be extremely sensitive to other ingredients used during the manufacture of paper. Such ingredients may be encountered either through addition of these ingredients to the high solids slurry or in residue left in equipment used for storing and transferring the high solids slurry.

Immediate flocculation has occurred when high solids slurries of titanium dioxide contact, for example, even small amounts of calcium carbonate or low pH stabilized latices; both are ingredients used in the manufacture of paper.

The use of ethanolamines to produce a titanium dioxide pigment slurry with a high solids suspension is described in U.S. Pat. 2,744,029, patented May 1, 1956, to Kingsbury. However, the Kingsbury patent neither suggests the method of production of the high solids slurries of this invention nor the properties of the composition of the present invention.

SUMMARY OF THE INVENTION

A stabilized titanium dioxide slurry containing from about 60 to 82 percent by weight solids is prepared by slurrying from about 10 to 45 percent of the total titanium dioxide in the slurry as a first portion titanium dioxide which is alumina treated polyphosphate dispersed titanium dioxide and a second portion titanium dioxide comprising the remaining titanium dioxide which is dry finished titanium dioxide which has been ground in the presence of alkanolamine. The first portion titanium dioxide is prepared by slurrying the titanium dioxide with an aluminum salt in an amount, calculated as $Al_2O_3$, of 0.3 to 3 percent by weight. The slurrry is neutralized to precipitate the aluminum salt as alumina. The slurry is then filtered and washed to produce a wet cake. An alkail metal polyphosphate dispersing agent is added to the wet cake in an amount in the range of 0.01 to 0.25 percent by weight based on the weight of the total titanium dioxide, which produces a fluid slurry of the wet cake. The dry finished titanium dioxide is treated by micronizing titanium dioxide with triethanolamine in an amount in the range of 0.1 to 0.4 percent. The treated dry finished titanium dioxide is added to the fluid slurry of the wet cake to produce a high solids slurry. A second alkanolamine selected from the group consisting of monoethanolamine and 2-amino-2-methyl-1-propanol is added in an amount in the range of 0.1 to 2 percent by weight total titanium dioxide to produce a stabilized high solids slurry of 78 to 82 percent by weight titanium dioxide. The stabilized high solids slurry is agitated to reduce the grit content of the slurry and can then be high-shear milled for 15 to 20 hours to increase the stability. Further dilution, if desired, can then be effected by addition of water.

The high solids slurry of this invention can be prepared from anatase or rutile titanium dioxide and these can be made by the well known sulfate or chloride processes.

The aluminum salts which are contemplated for use with the first portion titanium dioxide to produce the alumina treated titanium dioxide are water soluble aluminum compounds such as aluminum sulfate. Commercially produced alumina treated titanium dioxide may also be used with this invention. The preparation of such alumina treated titanium dioxide is taught in U.S. Pat. 2,284,772. The commercial alumina treated titanium dioxide is usually obtained in a dry form which can then be slurried in water to about 45 to 55 percent by weight solids. For example, alumina treated anatase titanium dioxide produced by E. I. du Pont de Nemours & Co., known as LOCR has about one percent by weight alumina and is operable in this invention.

Sodium hexametaphosphate, tetrapotassium pyrophosphate and potassium tripolyphosphate are suitable alkali metal polyphosphate dispersing agents to be used in this invention.

Preferably, the treated dry finished titanium dioxide is added to the fluid slurry of the wet cake in an amount sufficient to produce a high solids slurry with a solids content between about 78 to 82 percent by weight. The second alkanolamine can be added to the high solids slurry either during the addition of the treated dry finished titanium dioxide or immediately thereafter. Preferably, monoethanolamine or 2-amino-2-methyl-1-propanol is used in an amount of 0.25 percent by weight of the total titanium dioxide.

The slurry can be agitated in a high speed mixer or other suitable device to reduce grit to a level of 0.005 percent by weight +325 mesh (Tyler Standard Sieve Scale) to further reduce the sensitivity of the high solids slurry to other ingredients used in the manufacture of paper. Subjecting the high solids slurry to high shear milling, such as ball milling, for approximately 15 to 20 hours substantially reduces the sensitivity of the high solids slurry to calcium carbonate and other ingredients used in the manufacture of paper. Thereafter, appropriate dilution may be effected to a total solids content not below 60 percent by weight.

The following examples are illustrative of the invention and are not in limitation thereof. All parts and percentages are by weight unless otherwise noted.

EXAMPLE 1

This example illustrates a method of preparation of a high solids slurry of titanium dioxide. The first portion titanium dioxide is prepared by slurrying about 80 parts by weight of an alumina treated anatase titanium dioxide having 0.5 percent by weight alumina with water to make a wet cake containing 53.5 percent by weight solids. Sodium hexametaphosphate is added in an amount of 0.12 part to produce a fluid slurry of the wet cake.

A second portion titanium dioxide is prepared by micronizing 167 parts of dry finished anatase titanium dioxide with 0.27 part of triethanolamine. The treated dry finished anatase titanium dioxide is added to the first portion titanium dioxide, which has been alumina treated and phosphate dispersed, to produce a high solids slurry containing 78 percent solids by weight.

A second alkanolamine, monoethanolamine, is added to the high solids slurry in an amount of 0.6 part. The high solids slurry is stirred for 20 minutes on a high speed laboratory mixer to reduce the grit. The solids content of the high solids slurry is reduced to 70 percent by weight by the addition of 36 parts of water. The high solids slurry is then stirred for 5 minutes to give a stabilized high solids slurry of titanium dioxide having a grit content of 0.003 percent by weight +325 mesh (Tyler Standard Sieve Scale).

The wet cake of the above example can also be prepared by slurrying calcined anatase titanium dioxide in water and adding an aluminum salt, calculated as $Al_2O_3$, in an amount of from about 0.3 to 3 percent by weight of the titanium dioxide. The slurry is neutralized, filtered and washed to produce a wet cake having from about 45 to 55 percent solids by weight.

EXAMPLE 2

The product of Example 1 is tested for calcium carbonate sensitivity by adding 3.7 grams of a 67 percent slurry of calcium carbonate in water. The slurry is stirred continuously with the viscosity being tested periodically with a Brookfield viscometer (available from the Brookfield Engineering Company) to measure the torque necessary to rotate an element in a test liquid. The Brookfield viscosity in centipoises at 100 revolutions per minute was found to be:

| Time: | Viscosity, centipoises |
|---|---|
| 0 | 271 |
| 10 minutes | 356 |
| 1 hour | 377 |
| 5 hours | 430 |
| 20 hours | 551 |

The viscosity characteristics demonstrate the excellent insensitivity of the high solids slurry of this invention to calcium carbonate.

EXAMPLE 3

A high solids slurry is prepared in the same manner as in Example 1 except that 2.5 grams of 2-amino-2-methyl-1-propanol are added in place of the monoethanolamine. The viscosity characteristics were found to be similar to those given in Example 2.

EXAMPLE 4

This example illustrates the use of a high solids slurry of titanium dioxide in a latex system. A slurry is prepared in the same manner as in Example 1 except the following ingredients are used:

First portion $TiO_2$: 29.3% of total $TiO_2$
Second portion $TiO_2$: 70.7% of total $TiO_2$
$Al_2O_3$: 0.5% of first portion $TiO_2$
Sodium hexametaphosphate: 0.05% of total $TiO_2$
Monoethanolamine: 0.25% of total $TiO_2$
Triethanolamine: 0.17% of second portion $TiO_2$ This slurry is agitated at 80 percent by weight solids, then diluted with water to 70 percent by weight solids. An equivalent amount by weight of Dow 620, a low pH stabilized styrene butadiene latex (Dow Chemical Company) is mixed with the above slurry. The following viscosity measurements were obtained on a Brookfield viscometer at 100 revolutions per minute:

| Time: | Viscosity, centipoises |
|---|---|
| 0 | 330 |
| 2 days | 254 |

EXAMPLE 5

Three slurry samples A, B, and C are prepared in the same manner as taught in Example 1 except that:

Sample A is ball milled for 16 hours with a solids concentration of 78 percent by weight and then diluted to approximately 70 percent solids by weight;
Sample B is diluted to 70 percent solids by weight and then ball milled for 16 hours; and
Sample C is agitated with a high speed laboratory mixer for 20 minutes at 78 percent solids by weight and then diluted to 70 percent solids by weight.

The samples are then tested for calcium carbonate sensitivity using the procedure described in Example 2. The Brookfield viscosity in centipoises at 100 revolutions per minute was found to be:

| Time | Viscosity, cp. | | |
|---|---|---|---|
| | Sample A | Sample B | Sample C |
| 0 | 141 | 202 | 232 |
| 10 min | 202 | 266 | 310 |
| 1 hour | 220 | 290 | 335 |
| 5 hours | 255 | 335 | 412 |
| 72 hours | 341 | 520 | 3,010 |
| 120 hours | 435 | 772 | 9,000 |
| 168 hours | 485 | 1,410 | |

EXAMPLE 6

This example illustrates a method of preparation of a high solids slurry of titanium dioxide using tetrapotassium pyrophosphate as the dispersant for the first portion. The first portion titanium dioxide is prepared by slurrying 400 grams of an alumina treated anatase titanium dioxide having 1.0 percent by weight alumina with water to make a wet cake. Tetrapotassium pyrophosphate is added in an amount of 2.2 grams to produce a fluid slurry of the wet cake.

A second portion of titanium dioxide is prepared by micronizing 600 grams of dry finished anatase titanium dioxide containing 0.25 percent triethanolamine. The treated dry finished anatase titanium dioxide is added to the first portion titanium dioxide, which has been alumina treated and phosphate dispersed, to produce a high solids slurry containing 80 percent solids by weight.

A second alkanolamine, monoethanolamine, is added to the high solids slurry in an amount of 0.5 percent. The high solids slurry is stirred for 20 minutes on a high speed laboratory mixer to reduce the grit. The solids content of the high solids slurry is reduced to 72.5 percent by weight by the addition of water. The high solids slurry is then stirred for 5 minutes to give a stabilized high solids slurry of titanium dioxide.

EXAMPLE 7

A high solids slurry is prepared in the same manner as in Example 6 except that rutile titanium dioxide is used in place of the anatase titanium dioxide for the first portion of the titanium dioxide and potassium tripolyphosphate is used as the dispersant. The characteristics of the high solids slurry were found to be similar to those given in Example 6.

EXAMPLE 8

This example illustrates various alternative methods of preparing the first portion of wet cake as described in Example 1.

(A) The first portion $TiO_2$ is prepared by slurrying calcined anatase $TiO_2$ with an $NaAlO_2$ solution in water in an amount, calculated as $Al_2O_3$, of 0.75% by weight. The slurry is neutralized to precipitate the $Al_2O_3$ by the addition of hydrochloric acid. The slurry is then filtered and washed to produce a wet cake.

(B) A second method for preparing the first portion $TiO_2$ consists in also precipitating the $Al_2O_3$, but in this case by using an $Al_2(SO_4)_3$ solution and then neutralizing with caustic.

(C) A third method consists in precipitating the $Al_2O_3$ by using $NaAlO_2$ as before but neutralizing with sulfuric acid rather than hydrochloric acid.

High solids slurries are prepared by using wet cakes produced by the above three methods as starting matreial. The slurries are prepared in the same manner as in Example 1, except the following proportions are used:

First portion $TiO_2$: 25% of total $TiO_2$
Second portion $TiO_2$: 75% of total $TiO_2$
$Al_2O_3$: 0.75% of first portion $TiO_2$
Sodium hexametaphosphate: 0.1% of total $TiO_2$
Monoethanolamine: 0.25% of total $TiO_2$
Triethanolamine: 0.17% of second portion $TiO_2$ To determine $CaCO_3$ sensitivity, viscosities were tested periodically using the method described in Example 2.

| Time | Viscosity, cp. | | |
|---|---|---|---|
| | A ($NaAlO_2$+ HCl) | B ($Al_2(SO_4)_3$+ caustic) | C ($NaAlO_2$+ $H_2SO_4$) |
| 0 | 348 | 295 | 246 |
| 10 min | 498 | 467 | 370 |
| 1 hr | 514 | 492 | 386 |
| 3 hrs | 538 | 519 | 402 |
| 22 hrs | 681 | 765 | 556 |
| 48 hrs | 766 | 1,120 | 855 |
| 96 hrs | 948 | 2,680 | 2,464 |

From these data it is concluded that over prolonged periods the presence of sulfate ion tends to cause an increase in the viscosity of the slurry.

The above examples demonstrate the ability of the high solids slurry of this invention to be shipped and stored without the solids settling out and caking. The flow characteristics of the high solids slurry of this invention enable the present slurries to be pumped without difficulty. The calcium carbonate insensitivity of the high solids slurry of this invention and the ability to use the high solids slurry of this invention in latex system, as shown in the examples, enable the slurry of the present invention to be used without the problem of immediate flocculation.

It will be understood that if a chloride $TiO_2$ is used it is not necessary to calcine the first portion that is wet treated, but it can be advantageous to calcine the second portion in order to remove chlorine.

We claim:
1. A stabilized high solids, aqueous slurry of titanium dioxide containing 60 to 82 percent by weight total titanium dioxide consisting essentially of:

(a) first portion titanium dioxide in an amount in the range of 10 to 45 percent by weight of total titanium dioxide;
(b) alumina in an amount in the range of 0.3 to 3 percent by weight of the first portion titanium dioxide wherein the alumina has been precipitated on the first portion titanium dioxide;
(c) second portion titanium dioxide in an amount sufficient to supply the remaining titanium dioxide;
(d) triethanolamine in an amount from about 0.1 to 0.4 percent by weight of the second portion titanium dioxide wherein the second portion titanium dioxide has been micronized with the triethanolamine;
(e) alkali metal phosphate in an amount of from about 0.01 to 0.25 percent by weight of the total titanium dioxide;
(f) a second alkanolamine selected from the group consisting of monoethanolamine and 2-amino-2-methyl-1-propanol in an amount from about 0.1 to 2 percent by weight of the total titanium dioxide; and
(g) water in an amount sufficient to provide a slurry having from about 60 to 82 percent solids by weight.

2. A slurry of claim 1 wherein the alkali metal polyphosphate is sodium hexametaphosphate, tetrapotassium pyrophosphate, or potassium tripolyphosprate.

3. A slurry of claim 1 wherein the alkanolamine is monoethanolamine and is in an amount of about 0.25 percent by weight of the total titanium dioxide.

4. A slurry of claim 1 wherein the alkanolamine is 2-amino-2-methyl-1-propanol and is in an amount of about 0.25 percent by weight of the total titanium dioxide.

5. A slurry of claim 1 wherein the triethanolamine is in an amount of about 0.17 percent by weight of the second portion titanium dioxide.

6. A slurry of claim 1 wherein the slurry has from about 70 to 72 percent by weight titanium dioxide.

7. A method of producing a stabilized high solids, aqueous slurry of titanium dioxide containing 60 to 82 percent by weight titanium dioxide comprising:

(a) slurrying in water a first portion titanium dioxide in an amount of 10 to 45 percent by weight of the total titanium dioxide;
(b) adding an aluminum salt to the slurry in an amount calculated as $Al_2O_3$ of from about 0.3 to 3 percent by weight of the first portion titanium dioxide;
(c) neutralizing the slurry to precipitate the aluminum salt as alumina;
(d) filtering and washing the alumina treated slurry to produce a wet cake having from about 45 to 55 percent solids by weight;
(e) adding an alkali metal polyphosphate to the wet cake in an amount of from about 0.01 to 0.25 percent by weight of the total titanium dioxide to produce a fluid slurry of the wet cake;
(f) adding a second portion titanium dioxide to the fluid slurry of the wet cake to produce a high solids slurry having from about 78 to 82 percent by weight titanium dioxide wherein the second portion titanium dioxide has been treated by micronizing the second portion titanium dioxide with triethanolamine in an amount of from about 0.1 to 0.4 percent by weight of the second portion titanium dioxide;
(g) adding a second alkanolamine selected from the group consisting of monoethanolamine and 2-amino-2-methyl-1-propanol to the high solids slurry wherein the alkanolamine is in an amount of from about 0.1 to 2 percent by weight of the total titanium dioxide; and
(h) agitating the high solids slurry to reduce the grit content of the slurry with, optionally, dilution to the desired solids content.

8. A method of claim 7 wherein the wet cake is made by slurrying alumina treated titanium dioxide in water to produce a wet cake having from about 45 to 55 percent solids by weight wherein alumina is in an amount of 0.3 to 3 percent by weight of the treated titanium dioxide.

9. A method of claim 7 wherein the second alkanolamine is added to the fluid slurry of the wet cake during the addition of the second portion titanium dioxide.

10. A method of claim 7 wherein after the high solids slurry has been agitated, the solids slurry is high shear milled for 15 to 20 hours.

References Cited

UNITED STATES PATENTS

| | | | |
|---|---|---|---|
| 2,284,772 | 6/1942 | Seidel | 106—300 |
| 2,737,460 | 3/1956 | Werner | 106—300 |
| 2,744,029 | 5/1956 | Kingsbury | 106—300 |
| 2,933,408 | 4/1960 | Dempster | 106—300 |
| 3,015,573 | 1/1962 | Myers et al. | 106—300 |
| 3,076,719 | 2/1963 | Whately et al. | 106—300 |
| 3,178,303 | 4/1965 | Aagaard | 106—300 |
| 3,412,944 | 11/1968 | Wollenberg | 106—300 |
| 3,506,466 | 4/1970 | Bramekamp et al. | 106—300 |
| 3,567,479 | 3/1971 | Portes et al. | 106—308 N |

FOREIGN PATENTS 1,531,403  5/1968  France.

TOBIAS E. LEVOW, Primary Examiner

H. M. S. SNEED, Assistant Examiner

U.S. Cl. X.R.

106—308 N; 241—5, 29